(12) United States Patent
Banister

(10) Patent No.: US 10,838,827 B2
(45) Date of Patent: Nov. 17, 2020

(54) SYSTEM AND METHOD FOR TIME PARAMETER BASED DATABASE RESTORATION

(71) Applicant: Richard Banister, Vista, CA (US)

(72) Inventor: Richard Banister, Vista, CA (US)

( * ) Notice: Subject to any disclaimer, the term of this patent is extended or adjusted under 35 U.S.C. 154(b) by 565 days.

(21) Appl. No.: 14/855,552

(22) Filed: Sep. 16, 2015

(65) Prior Publication Data
US 2017/0075775 A1 Mar. 16, 2017

(51) Int. Cl.
*G06F 11/14* (2006.01)

(52) U.S. Cl.
CPC ...... *G06F 11/1469* (2013.01); *G06F 11/1448* (2013.01); *G06F 2201/80* (2013.01); *G06F 2201/835* (2013.01); *G06F 2201/84* (2013.01)

(58) Field of Classification Search
CPC ......... G06F 17/30575; G06F 17/30073; G06F 11/1451; G06F 11/1446; G06F 11/1469; G06F 11/1458; G06F 2201/84; G06F 3/065
USPC ......... 707/639, 640, 644, 661, 667, 999.204
See application file for complete search history.

(56) References Cited

U.S. PATENT DOCUMENTS

| | | | |
|---|---|---|---|
| 5,721,918 A | 2/1998 | Nilsson | |
| 5,806,067 A | 9/1998 | Connor | |
| 5,909,678 A | 6/1999 | Bergman | |
| 6,073,131 A | 6/2000 | Roberti | |
| 6,161,111 A | 12/2000 | Mutalik | |
| 6,208,990 B1 | 3/2001 | Suresh et al. | |
| 6,324,581 B1 | 11/2001 | Xu | |
| 6,564,215 B1 * | 5/2003 | Hsiao | G06F 11/1469 |
| 6,850,947 B1 | 2/2005 | Chung et al. | |
| 7,293,027 B2 | 11/2007 | Margolus | |
| 7,330,997 B1 | 2/2008 | Odom | |

(Continued)

*Primary Examiner* — Dung K Chau
(74) *Attorney, Agent, or Firm* — Patrick Reilly

(57) ABSTRACT

A system and method are provided for the recovery and restoration of software records of a database server to record iterations previous to the current state of the selected records. This action may be taken in order to overcome the consequences of database corruption. An event-time maybe designated which is applied to select some or all of the earlier but most recent versions of each selected record. The system and method presented include a local target database for the purpose of recording software records to an archive, and may include a remote source database, from which records may be transmitted to the local target database. A restore command may be detected by the database server as sent from the remote source server, as received in an electronic message, as received via an electronics communications network, or as directly input. The local target database may have access to multiple iterations or versions of a software record including the original record version as stored in an archive, and may, upon instruction or command, revert to a previous iteration of a software record stored in the archive if corruption of later iterations is suspected. Alternatively or additionally, the local target database may not be restored with earlier versions of records but the remote source database may be restored with the selected record versions. The software records may optionally be updated in a batch method, or may alternatively be updated in real time, as the software records are created.

27 Claims, 11 Drawing Sheets

(56) References Cited

U.S. PATENT DOCUMENTS

| | | |
|---|---|---|
| 7,467,267 B1 | 12/2008 | Mayock |
| 7,774,315 B1 * | 8/2010 | Galker ............... G06F 11/1456 707/644 |
| 7,822,717 B2 | 10/2010 | Kapoor |
| 7,917,512 B2 | 3/2011 | Bhide |
| 7,941,408 B2 | 5/2011 | Sinha |
| 7,953,710 B2 | 5/2011 | Novik |
| 8,099,392 B2 | 1/2012 | Paterson |
| 8,117,165 B1 * | 2/2012 | Winckelmann ... G06F 17/30377 707/640 |
| 8,122,040 B2 | 2/2012 | Banister et al. |
| 8,301,652 B2 | 10/2012 | Zhou |
| 8,311,988 B2 | 11/2012 | Cisler |
| 8,352,490 B2 | 1/2013 | Hansen |
| 8,375,010 B2 | 2/2013 | Banister et al. |
| 8,442,951 B1 | 5/2013 | Brannon |
| 8,495,041 B2 | 7/2013 | Enoki |
| 8,548,945 B2 | 10/2013 | Dwyer et al. |
| 8,666,944 B2 | 3/2014 | Beatty |
| 8,745,029 B2 | 6/2014 | Banister et al. |
| 8,954,401 B2 | 2/2015 | Zhang et al. |
| 9,286,166 B2 | 3/2016 | Paterson |
| 9,454,587 B2 | 9/2016 | Lyons |
| 9,754,001 B2 | 9/2017 | Banister et al. |
| 9,831,787 B1 | 11/2017 | Yueh |
| 10,025,673 B1 | 7/2018 | Maccanti |
| 2002/0004883 A1 | 1/2002 | Nguyen |
| 2002/0059299 A1 | 5/2002 | Spaey |
| 2002/0078218 A1 | 6/2002 | Feig |
| 2002/0095413 A1 | 7/2002 | Meding |
| 2002/0138376 A1 | 9/2002 | Hinkle |
| 2002/0161784 A1 * | 10/2002 | Tarenskeen ............ G06Q 10/10 |
| 2003/0120625 A1 | 6/2003 | Jackson |
| 2004/0078228 A1 | 4/2004 | Fitzgerald |
| 2004/0236796 A1 | 11/2004 | Bhatt |
| 2005/0055518 A1 | 3/2005 | Hochberg |
| 2005/0055519 A1 | 3/2005 | Stuart |
| 2005/0120062 A1 | 6/2005 | Sinha |
| 2006/0020616 A1 | 1/2006 | Hardy |
| 2006/0085608 A1 | 4/2006 | Saika |
| 2006/0179155 A1 * | 8/2006 | Bunting .................. H04L 67/06 709/232 |
| 2006/0190947 A1 | 8/2006 | Ghosh |
| 2007/0028056 A1 | 2/2007 | Harris |
| 2007/0100913 A1 * | 5/2007 | Sumner ............... G06F 11/1453 |
| 2007/0106666 A1 | 5/2007 | Beckerle |
| 2007/0106845 A1 | 5/2007 | Chu |
| 2007/0136381 A1 | 6/2007 | Cannon |
| 2007/0183224 A1 | 8/2007 | Erofeev |
| 2007/0185937 A1 | 8/2007 | Prahlad |
| 2007/0186068 A1 | 8/2007 | Agrawal |
| 2008/0034011 A1 | 2/2008 | Cisler |
| 2008/0184232 A1 | 7/2008 | Clark |
| 2008/0263007 A1 | 10/2008 | Schmidt |
| 2008/0307345 A1 | 12/2008 | Hart |
| 2008/0307347 A1 | 12/2008 | Gisler |
| 2009/0077075 A1 | 3/2009 | Bent |
| 2009/0150336 A1 | 6/2009 | Basu |
| 2009/0210429 A1 | 8/2009 | Agrawal |
| 2009/0249005 A1 | 10/2009 | Bender |
| 2009/0287746 A1 | 11/2009 | Brown |
| 2010/0082553 A1 | 4/2010 | Beatty |
| 2010/0318495 A1 | 12/2010 | Yan |
| 2011/0167148 A1 | 7/2011 | Bodziony et al. |
| 2012/0124081 A1 | 5/2012 | Ebrahimi |
| 2012/0221522 A1 | 8/2012 | Allman et al. |
| 2012/0254137 A1 | 10/2012 | Rozenwald |
| 2012/0323924 A1 | 12/2012 | Okun |
| 2013/0036089 A1 | 2/2013 | Lucas |
| 2013/0042083 A1 | 2/2013 | Mutalik |
| 2013/0191523 A1 | 7/2013 | Buck |
| 2013/0212599 A1 | 8/2013 | Giampaolo |
| 2013/0232331 A1 | 9/2013 | Farhan |
| 2013/0238552 A1 | 9/2013 | Saib |
| 2013/0275379 A1 * | 10/2013 | Trebas ................ G06F 17/3012 707/644 |
| 2013/0339379 A1 | 12/2013 | Ferrari |
| 2013/0346365 A1 | 12/2013 | Kan |
| 2014/0006357 A1 * | 1/2014 | Davis .................. G06F 11/1464 707/667 |
| 2014/0007239 A1 * | 1/2014 | Sharpe ................. G06F 21/561 726/24 |
| 2014/0074790 A1 * | 3/2014 | Berman .............. G06F 17/3007 707/649 |
| 2014/0229506 A1 | 8/2014 | Lee |
| 2015/0066865 A1 | 3/2015 | Yara |
| 2015/0142751 A1 * | 5/2015 | Bruce ................ G06F 17/30575 707/662 |
| 2015/0163206 A1 * | 6/2015 | McCarthy ........... G06F 21/6227 713/171 |
| 2015/0205850 A1 | 7/2015 | Lu |
| 2015/0331755 A1 | 11/2015 | Morgan |
| 2015/0378865 A1 | 12/2015 | Robertson |
| 2016/0352815 A1 | 12/2016 | Mozolewski |

* cited by examiner

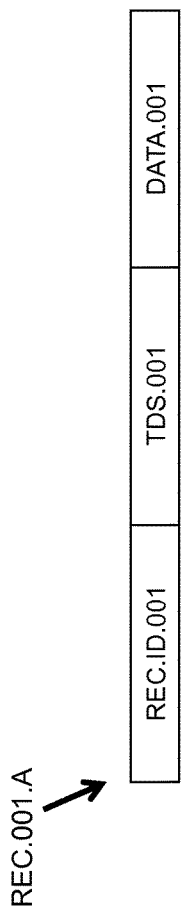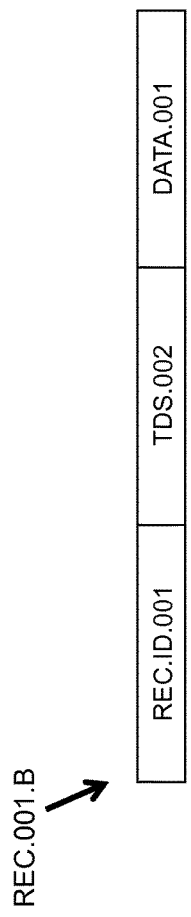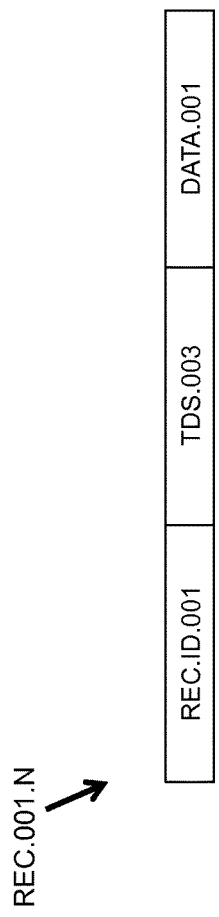

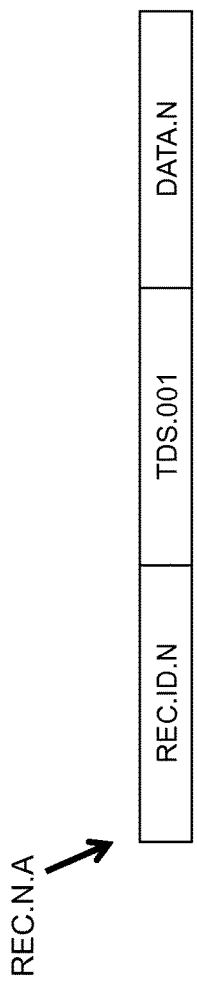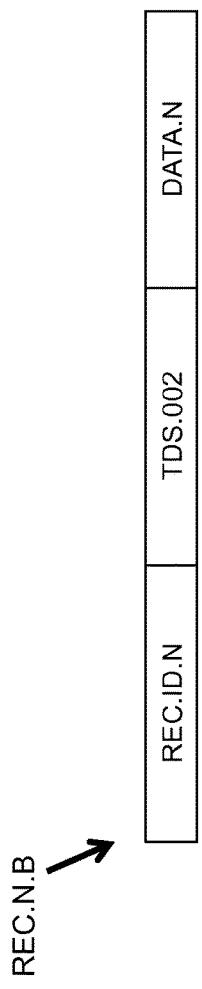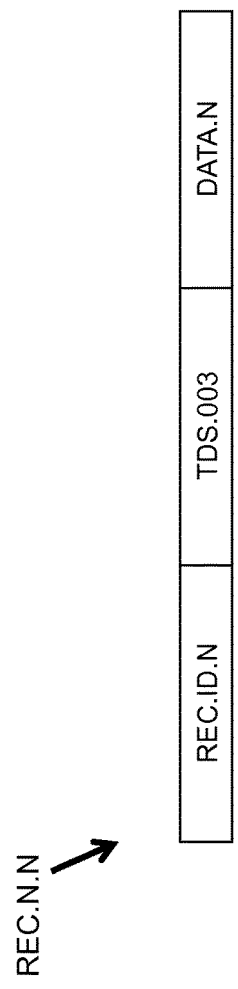

RESTORE COMMAND

MESSAGE: ARCHIVE TO SOURCE SYSTEM

MESSAGE: SOURCE SYSTEM TO TARGET SYSTEM

MESSAGE: TARGET SYSTEM TO SOURCE SYSTEM

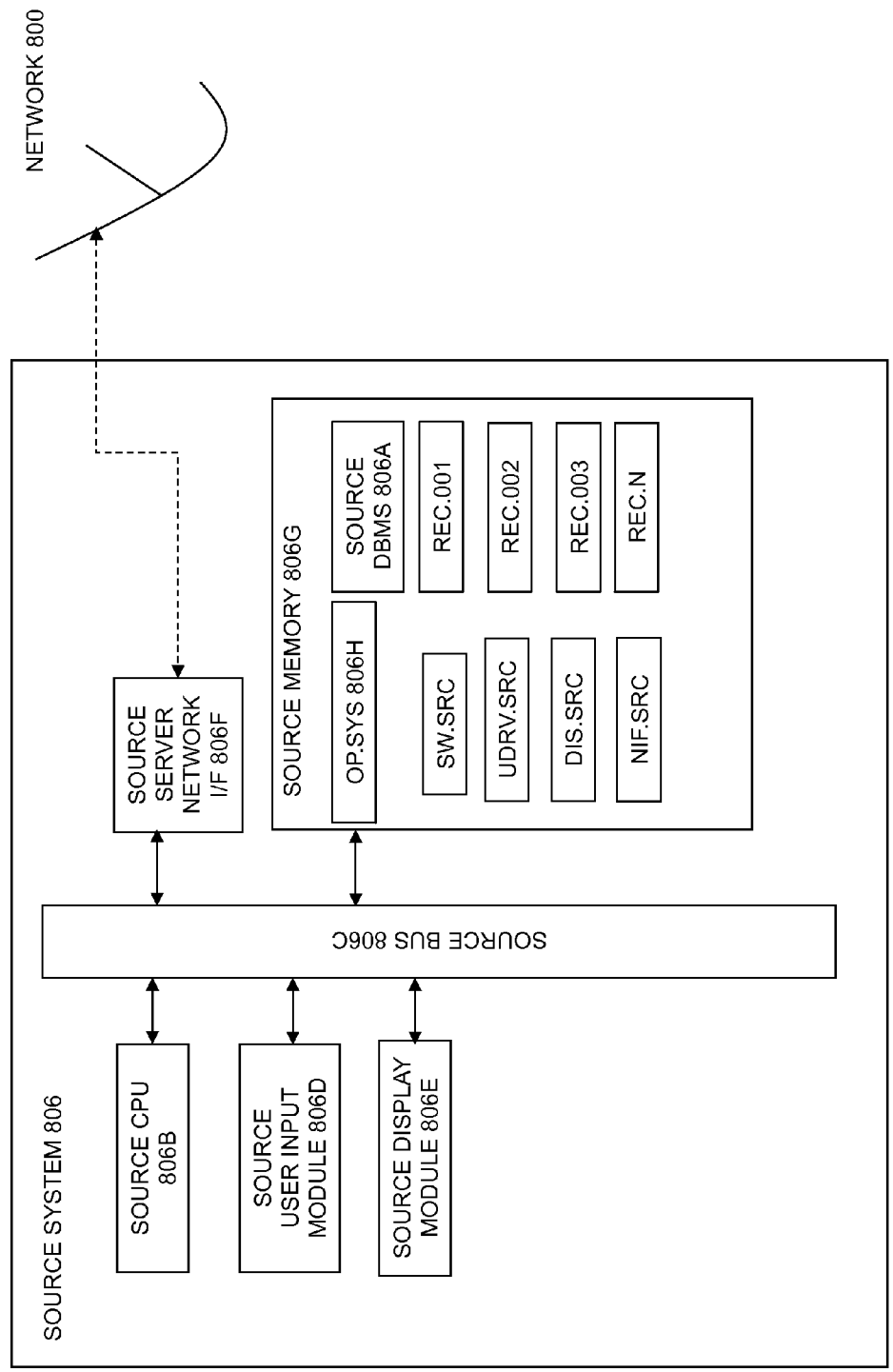

SYSTEM AND METHOD FOR TIME PARAMETER BASED DATABASE RESTORATION

FIELD OF THE INVENTION

The present invention relates to a process for the maintenance and update of digitized records. More particularly, the present invention relates to a system for restoring the state of records database to state existing before a specific time or event-time occurrence.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Databases are ubiquitous and crucial in consumer, business, and government operations. However, databases may be corrupted, or a user may have a fear that database corruption may have occurred. Yet, there exists no optimal method or system in the prior art to enable the efficient recovery and/or restoration of database records from a designated time and/or designated time of an event occurrence.

There is therefore a long-felt need to provide a method and system that provide the regeneration of databases as they existed at or before a designated time or event occurrence.

SUMMARY AND OBJECTS OF THE INVENTION

Towards these objects and other objects that will be made obvious in light of the present disclosure, a system and method are provided to enable the recovery of a database as the database substantially existed at a specific time or event.

In a first preferred embodiment of the method of the present invention (hereinafter "the invented method"), a software record revision is received and is selected or assigned for inclusion in a first database (hereinafter, "the target database"). When an earlier version of this instant database record is currently stored in the target database, the earlier database record is stored in an archival database (hereinafter, "the archive") and the newly designated software record revision is then written into the target database. Preferably, the earlier version of the instant record is deleted from the target database, wherein the earlier version may be merely deleted from the target database or overwritten with the newer software record revision.

According to optional aspects of the invented invention, a computer system having access to the archive receives or generates a restore date time data. The archive is then examined and each software record having a revision with a revision date time stamp previous to the restore date time data is selected; when a selected record has more than one revision stored in the archive, the revision of the selected record having a revision time date stamp earlier than but closest to the restore date time data is selected for a restore action. In the restore action, each selected record revision is communicated to a remote database server and/or the target database.

According to other optional aspects of the invented method, the target database is not revised with the selected record revisions in the restore action and a remote database (hereinafter, ("source database") is provided with the record revisions selected for the restore action.

According to yet other optional aspects of the invented method, the target database is revised with the selected record revisions in the restore action.

In still other aspects of invented method, the target database may optionally receive and update software records in one of two manners. First, the archive may optionally receive software records and record revisions in a batch method, i.e. by receiving a plurality of records from a remote source server within a substantively contemporaneous download, and by updating and storing the software records and record revision as a group. Additionally and optionally, the target database may optionally receive and update the software records and record updates in real time, i.e. when a software record is created or updated, the software record may be individually transmitted to the target database to be stored.

The source database and/or the target database may be or comprise an object-oriented database, a relational database, and/or a NoSQL database. It is understood that the scope of meaning of the term "NoSQL" as defined within the present disclosure includes a class of database management systems that do not follow all of the rules of a relational database management system and might not use traditional structured query language (hereinafter, "SQL") to query data. This type of database is generally a complementary addition to relational database management systems and SQL. Some notable implementations of NoSQL are the CASSANDRA DATABASE™, marketed by Facebook, Inc., of Menlo Park, Calif.; BIGTABLE™ marketed by Google, Inc., of Mountain View, Calif.; and SIMPLEDB™, marketed by Amazon.com, Inc., of Seattle, Wash.

A NoSQL database does not necessarily follow the strict rules that govern transactions in relational databases. These violated rules are Atomicity, Consistency, Integrity, Durability. For example, NoSQL databases do not use fixed schema structures and SQL joins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

These, and further features of the invention, may be better understood with reference to the accompanying specification and drawings depicting the preferred embodiment, in which:

FIGS. 4A-4C are block diagrams of revisions of an exemplary first software record;

FIGS. 6A-6C are block diagrams of revisions of an exemplary Nth software record;

FIG. 10 is a block diagram of the source server of the electronic communications network of FIG. 8.

DETAILED DESCRIPTION

Figure 1:
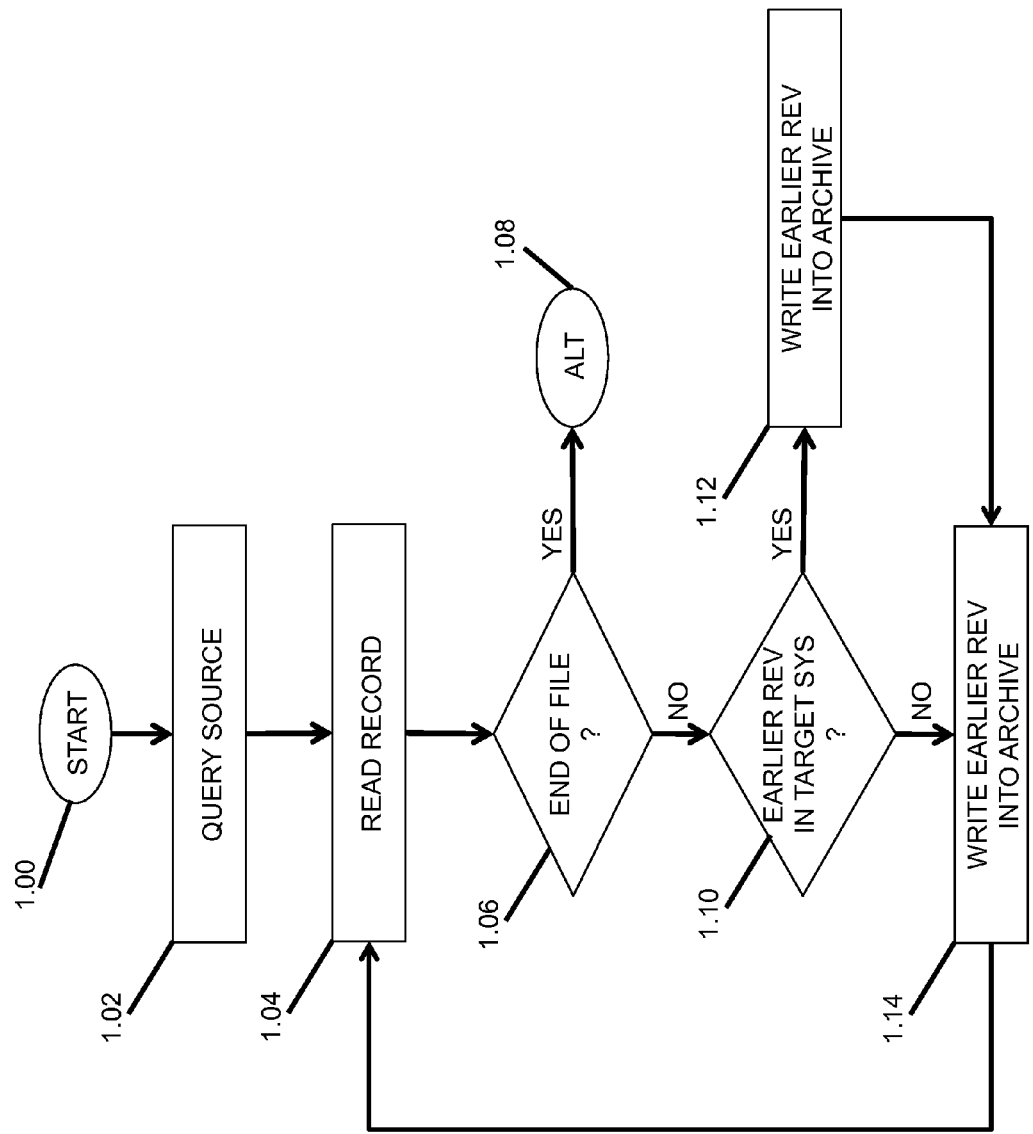
FIG. 1 is a flowchart of a preferred embodiment of the invented method whereby a record is received, stored, and restored by a target system.

Referring now generally to the Figures, and particularly to FIG. 1, FIG. 1 is a flowchart of a preferred aspect of the invented method, whereby one or more software records REC.001-REC.N are selected, stored and restored by a target database management system 802 (hereinafter, "target system" 802). In step 1.02 the target system 802 queries a source server 806 for one or more software records REC.001-REC.N. In step 1.04 the target system 802 reads an exemplary first received software record REC.001. In step 1.06 the target system 802 determines whether the exemplary data record REC.001 read in step 1.04 is an end of file marker EOF.001, marking the end of an exemplary file of received software records REC.001-REC.N. When the target system 802 determines in step 1.06 that an end of file marker EOF.001 has been read, the target system 802 proceeds directly to step 1.08, wherein the target system 802 executes alternate operations. Alternatively, when the target system 802 determines in step 1.06 that an end of file marker EOF.001 has not been read, the target system 802 determines in step 1.10 whether an earlier revision REC.001.A-REC.001.N of the exemplary software record REC.001 exists within a memory 802G of the target system 802. In order to determine whether earlier revisions REC.001.A-REC.001.N of a designated software record REC.001 exist within the target system 802, the target system 802 compares a record identifier REC.ID.001 of the new record REC.001 to the record identifiers of the records REC.001-REC.N within the memory 802G of the target system 802. When the target system 802 determines in step 1.10 that an earlier revision REC.001.A-REC.001.N of the exemplary software record REC.001 exists within the memory 802G of the target system 802, the target system 802 writes the earlier revision REC.001.A-REC.001.N to an archive database 1003 of an archive database management system 804 in step 1.12. In the alternative, when the target system 802 determines in step 1.10 that no earlier revision REC.001.A-REC.001.N of the exemplary software record REC.001 exists within the memory 802G of the target system 802, or upon execution of step 1.12, the target system 802 stores the new revision REC.001.A-REC.001.N of the exemplary software record REC.001 in the memory 802G of the target system 802.

Figure 2:
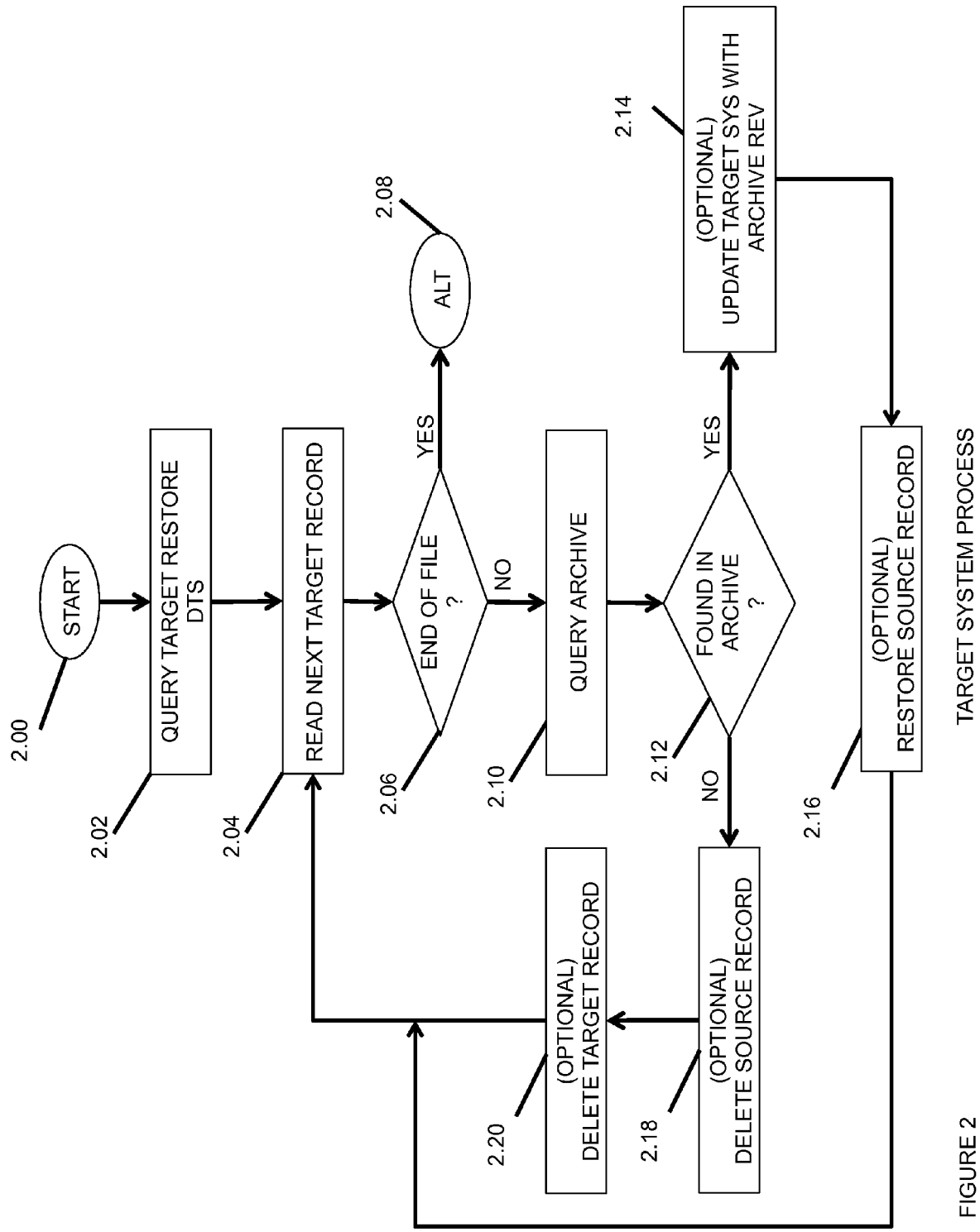
FIG. 2 is flowchart of a preferred embodiment of the invented method whereby a restore command is executed by the target system.

Referring now generally to the Figures, and particularly to FIG. 2, FIG. 2 is a flowchart of a preferred embodiment of the invented method whereby a restore command RST.CMD.001 is executed by the target system 802. In step 2.02 the target system 802 queries the target database memory 802G for the date time stamp of the restore command CMD.DTS.001. In step 2.04 the target system 802 reads a first software record REC.001-REC.N in the target system 802. In step 2.06 the target system 802 determines whether an end of file marker EOF.001 has been read. When the determination in step 2.06 that an end of file marker EOF.01 has been read, the target system 802 executes alternate operations in step 2.08. Alternatively, when the determination in step 2.06 that an end of file marker EOF.01 has not been read, the target system 802 queries the archive database management system 804 (hereinafter, "the archive DBMS" 804) for a data record REC.001-REC.N having a same record identification REC.ID.001-REC.ID.N as the target record REC.001-REC.N read in step 2.04. In step 2.12 the target system 802 determines whether the data record REC.001-REC.N having a same record identification REC.ID.001-REC.ID.N as the target record REC.001-REC.N read in step 2.04 is present in the archive DBMS 804. When the target system 1102 determines in step 2.12 that the data record REC.001-REC.N having a same record identification REC.ID.001-REC.ID.N as the target record REC.001-REC.N read in step 2.04 is no present in the archive DBMS 804, the target system 802 proceeds to optional step 2.14, wherein the target system 802 is optionally updated with the record revision REC.001.A-REC.001.N found in the archive DBMS 804. In optional step 2.16 the target system 802 optionally transmits the restored record REST.REC.001-REST.REC.N to the source server 806.

In the alternative, when the target system determines in step 2.12 the data record REC.001-REC.N having a same record identification REC.ID.001-REC.ID.N as the target record REC.001-REC.N read in step 2.04 is present in the archive DBMS 804, the target system 802 proceeds to optional step 2.18. In optional step 2.18 the record revision REC.001.A-REC.001.N in the source server 806 is optionally deleted. The record revision REC.001.A-REC.001.N may optionally be deleted outright, or may be overwritten by the incoming record revision REC.001.A-REC.001.N. In optional step 2.20 the record revision REC.001.A-REC.001.N in the target system 802 is optionally deleted. The record revision REC.001.A-REC.001.N may optionally be deleted outright, or may be overwritten by the new record revision REC.001.A-REC.001.N. In various alternate preferred embodiments of the invented method, upon successful execution of step 2.12, step 2.14, step 2.16, step 2.18 or step 2.20, the target system 802 returns to step 2.04, wherein an additional record REC.001-REC.N is read by the target system 802.

Figure 3:
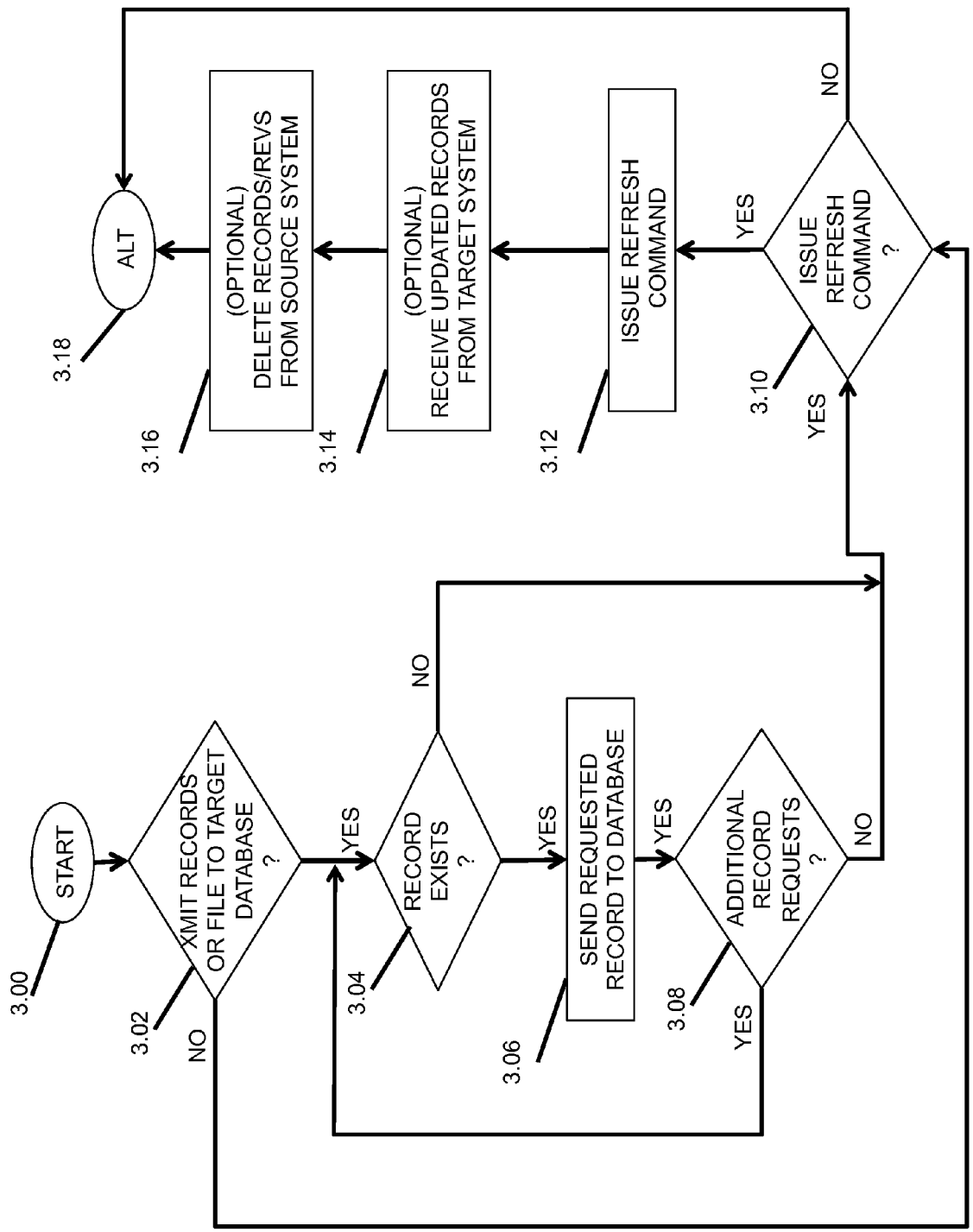
FIG. 3 is a flowchart of a an aspect of the preferred embodiment of the invented method whereby the source server transmits software records and/or a restore command to the target system.

Referring now generally to the Figures, and particularly to FIG. 3, FIG. 3 is a flowchart of an aspect of the invented method whereby the source server 806 transmits a restore command RST.CMD.001 and/or one or more software records REC.001-REC.N to the target system 802. In step 3.02 the source server 806 determines whether to transmit one or more software records REC.001-REC.N, either individually or in a file of software records REC.001-REC.N to the target system 802. When the source server 806 determines in step 3.02 to transmit one or more software records REC.001-REC.N, the source server 806 determines in step 3.04 whether the requested record(s) REC.001-REC.N exist within the memory 806G of the source server 806. When the source server 806 determines in step 3.04 that the requested record(s) REC.001-REC.N exist within the memory 806G of the source server 806, the source server 806 transmits the requested one or more software record(s) REC.001-REC.N to the target system 802. In step 3.08 the source server 806 determines whether additional software record request messages REQ.001-REQ.N for software records REC.001-REC.N have been received from the target system 802. When the source server 806 determines in step 3.08 that additional software record request messages REQ.001-REQ.N for software records REC.001-REC.N have been received from the target system 802, the source server 806 proceeds to step 3.04 and repeats the loop of steps 3.04 through 3.08 until it is determined in step 3.08 that no additional software record request messages REQ.001-REQ.N for software records REC.001-REC.N have been received from the target system 802.

When the source server 806 determines in step 3.02 not to transmit one or more software records REC.001-REC.N to the target system 802, or when the source server 806 determines that the requested record(s) REC.001-REC.N do not exist within the memory 806G of the source server 806 in step 3.04, or when the source server 806 determines that no additional software record request messages REQ.001-REQ.N for software records REC.001-REC.N have been received from the target system 802 in step 3.08, the source server 806 proceeds to step 3.10, wherein the source server 806 determines whether to issue a restore command RST.CMD.001 to the target system 802. When the source server 806 determines in step 3.10 to issue a restore command RST.CMD.001 to the target system 802, the source server 806 issues the restore command RST.CMD.001 to the target system 802 in step 3.12. In optional step 3.14, the source server 806 may optionally receive restored software records REST.REC.001-REST.REC.N from the target system 802. In further optional step 9.16 the source server 806 may optionally delete designated records REC.001-REC.N and/or record revisions REC.001.A-REC.N.N from the memory 806G of the source server 806. Alternatively, when the source server 806 determines in step 3.10 not to issue a restore command RST.CMD.001 to the target system 802, the source server 806 proceeds to step 3.18, wherein the source server 806 executes alternate operations.

Referring now generally to the Figures, and particularly to FIGS. 4A through 4C, FIGS. 4A through 4C are block diagrams of exemplary software record versions REC.001.A-REC.002.N, which may optionally be stored within the target system 802, the archive DBMS 804, and/or the source server 806. FIGS. 4A through 4C show exemplary first, second and Nth software record versions REC.001.A, REC.001.B and REC.001.C, respectively, which exemplary first, second, and third software record versions REC.001.A, REC.001.B and REC.001.N comprise: a first record identifier REC.ID.001 by which the first software record versions REC.001 may be recognized by the target system 802, by the archive DBMS 804, and/or by the source server 806; a first time date stamp TDS.001, a second time date stamp TDS.002, and a third time date stamp TDS.003, describing the time at which the software record version REC.001.A, REC.001.B and REC.001.N were created, respectively; and record data DATA.001.

The inclusion of three optional time date stamps TDS.001 through TDS.003 is for illustrative purposes only, and should not be construed as a restriction on the number of revisions which may occur for an exemplary software record REC.001, which number of revisions may be as numerous or as few as is deemed necessary by a user 808 or by software SW.TGT of the target system 802, software SW.ARC of the archive DBMS 804, and/or software SW.SRC of the source server 806.

Figure 5A:
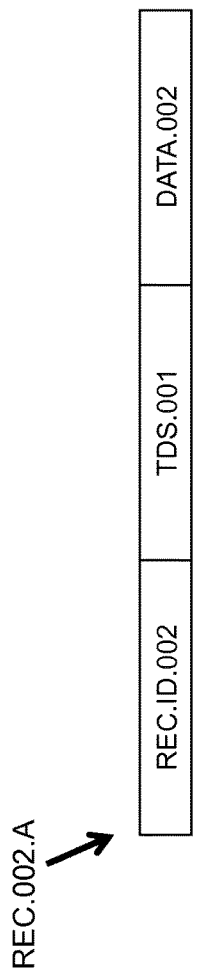
FIGS. 5A-5C are block diagrams of revisions of an exemplary second software record.
Figure 5B:
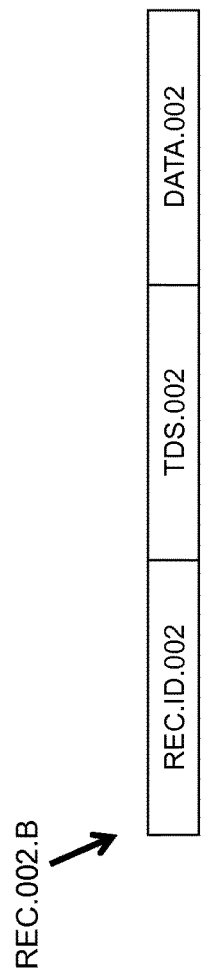
Figure 5C:
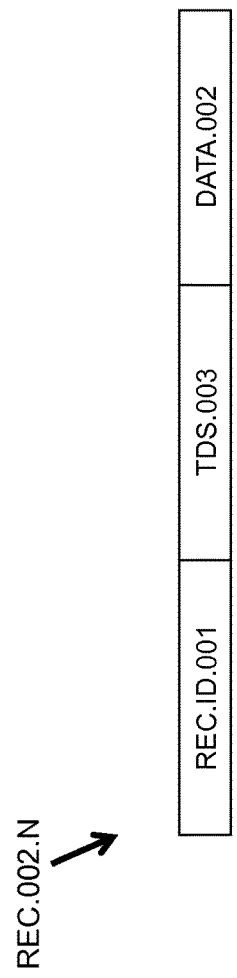

Referring now generally to the Figures, and particularly to FIGS. 5A through 5C, FIGS. 5A through 5C are block diagrams of exemplary software records REC.002.A-REC.002.N, which may optionally be stored within the target system 802, the archive DBMS 804, and/or the source server 806. FIGS. 5A through 5C show exemplary first, second and Nth software record versions REC.002.A, REC.002.B and REC.002.N, respectively, which exemplary first, second, and Nth software record versions REC.002.A. REC.002B and REC.002.N comprise: a second record identifier REC.ID.002 by which the second software record REC.002 may be recognized by the target system 802, by the archive DBMS 804, and/or by the source server 806; a first time date stamp TDS.001, a second time date stamp TDS.002, and a third time date stamp TDS.003, describing the time at which the software record version REC.001.A, REC.001.B and REC.001.N were created, respectively; and record data DATA.002.

Referring now generally to the Figures, and particularly to FIGS. 6A through 6C, FIGS. 6A through 6C are block diagrams of exemplary software records REC.N.A-REC.N.N, which may optionally be stored within the target system 802, the archive DBMS 804, and/or the source server 806. FIGS. 6A through 6C show exemplary first, second and Nth software record versions REC.N.A, REC.N.B and REC.N.N, respectively, which exemplary first, second, and Nth software record versions REC.N.A. REC.N.B and REC.N.N comprise: an Nth record identifier REC.ID.N by which the Nth software record REC.N may be recognized by the target system 802, by the archive DBMS 804, and/or by the source server 806; a first time date stamp TDS.001, a second time date stamp TDS.002, and a third time date stamp TDS.003, describing the time at which the software record version REC.N.A, REC.N.B and REC.N.N were created, respectively; and record data DATA.N.

Figure 7A:
FIG. 7A is a block diagram of an exemplary restore command.
Figure 7B:
FIG. 7B is a block diagram of an exemplary first software record containing message transmitted from the archive database management system to the source server.

Referring now generally to the Figures, and particularly to FIG. 7A, FIG. 7A is a block diagram of an exemplary restore command RST.CMD.001. The exemplary restore command RST.CMD.001 comprises: a restore command identifier RST.ID.001, by which the restore command RST.CMD.001 may be recognized by the target system 802, by the archive DBMS 804, and/or by the source server 806; a command time date stamp CMD.TDS.001, indicating the time point to which the restore command RST.CMD.001 will return the designated software records REC.001-REC.N; an address of the source server 806 SRC.ADDR as the sending address of the restore command RST.CMD.001; and an address of the target system 802 TGT.ADDR as the receiving address of the restore command RST.CMD.001;

Referring now generally to the Figures, and particularly to FIG. 7B, FIG. 7B is a block diagram of an exemplary first software record REC.001-REC.N containing message MSG.001 (hereinafter "first message MSG.001") transmitted from the archive DBMS 804 to the source server 806. The exemplary first MSG.001 contains: a first unique message identifier MSG.ID.001, by which the exemplary first message may be recognized; a message time date stamp MSG.TDS.001, indicating the time point at which the first MSG.001 was transmitted; an address ARC.ADDR of the archive DBMS 804 as the sending address of the first message MSG.001; an address SRC.ADDR of the source server 806 as the receiving address of the first message MSG.001; and a plurality of software records REC.001-REC.N.

Figure 7C:
FIG. 7C is a block diagram of an exemplary second software record containing message transmitted from the source server to the target system.

Referring now generally to the Figures, and particularly to FIG. 7C, FIG. 7C is a block diagram of an exemplary second software record REC.001-REC.N containing message MSG.002 (hereinafter "second message MSG.002") transmitted from the source server 806 to the target system 802. The second message MSG.002 comprises: a second message identifier MSG.ID.002, by which the second message MSG.002 maybe recognized; a second message time date stamp MSG.TDS.002, indicating the time point at which the second message MSG.002 was transmitted from the source server 806; an address SRC.ADDR of the source server 806 as the sending address of the second message MSG.002; an address TGT.ADDR of the target system 802 as the receiving address of the second message MSG.002; and a plurality of software records REC.001-REC.N.

Figure 7D:
FIG. 7D is a block diagram of an exemplary third software record containing message transmitted from the target system to the source server.

Referring now generally to the Figures, and particularly to FIG. 7D, FIG. 7D is a block diagram of an exemplary third software record REC.001-REC.N containing message MSG.003 (hereinafter "third message MSG.003") transmitted from the target system 802 to the source server 806. The third message MSG.003 comprises: a third message identifier MSG.ID.003, by which the third message MSG.003 may be recognized; a third message time date stamp MSG.TDS.003, indicating the time point at which the third message MSG.003 was transmitted from the target system 802; an address TGT.ADDR of the target system 802 as the sending address of the third message MSG.003; an address SRC.ADDR of the source server 806 as the receiving address of the third message MSG.003; and a plurality of software records REC.001-REC.N.

Figure 8:
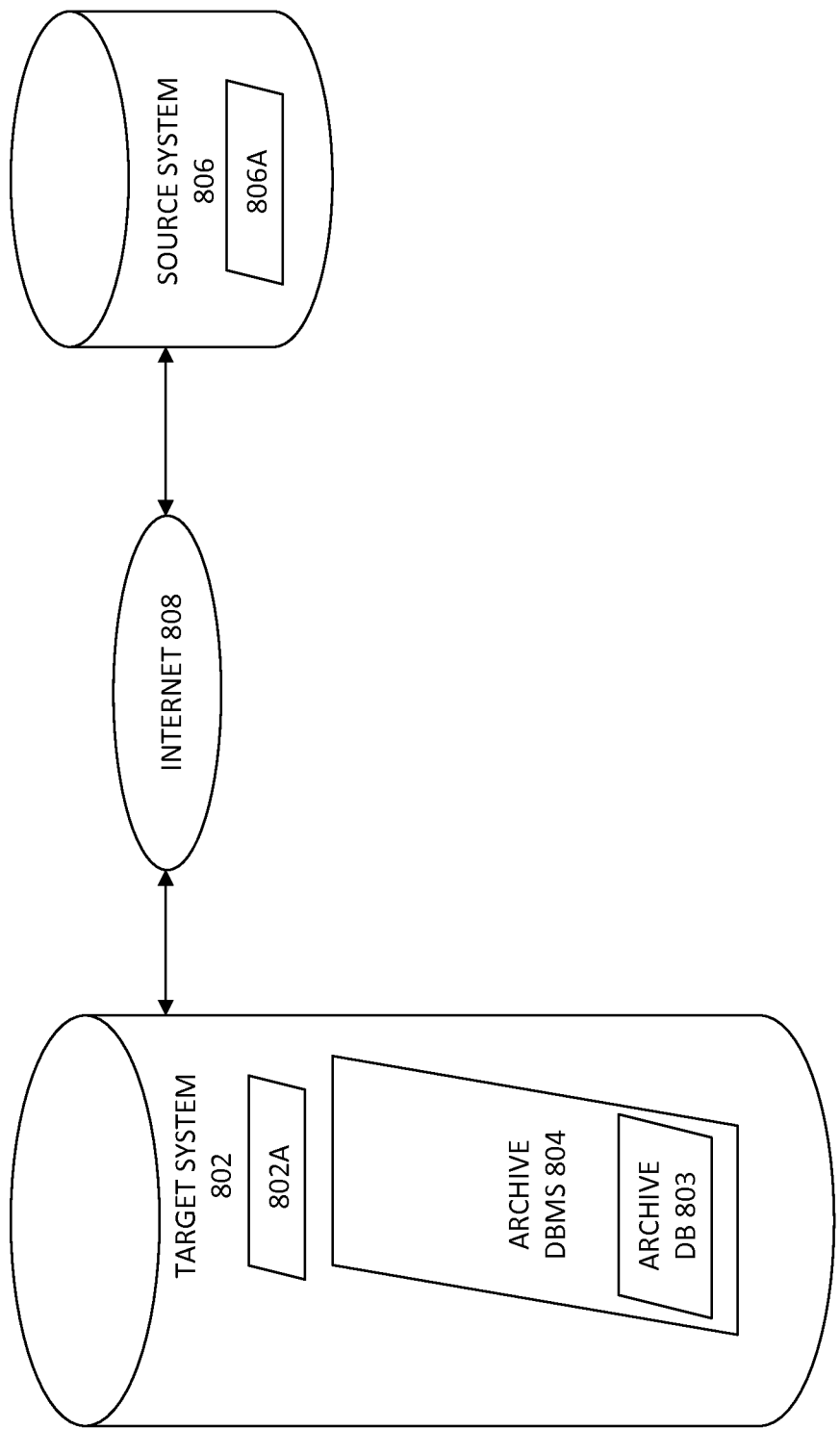
FIG. 8 is a diagram of an electronic communications network, comprising a target system, a source server, and an archive database management system, bidirectionally communicatively coupled by means of the Internet bidirectionally coupled to the source server.

Referring now generally to the Figures, and particularly to FIG. 8, FIG. 8 is a diagram of an electronic communications network optionally comprising the Internet 801. The electronic communications network 800 may further comprise a target system 802, an archive DBMS 804, and a source server 806, bidirectionally coupled to the source server 806. The electronic communications network 800 bi-directionally communicatively couples, wherein the bidirectional communicative coupling may be accomplished via the Internet 801 and/or other suitable communications structures, equipment and systems known in the art. The archive DBMS 804, the source server 806, and the target system 802, each preferably comprise or are bi-directionally communicatively coupled with a separate database management system software, respectively an archive DBMS 804, a source DBMS 806A, and a target DBMS 802A.

The archive DBMS 804, the source DBMS 806A, and/or the target DBMS 802A may be or comprise an object oriented database management system ("OODBMS"), a relational database management system ("RDBMS") and/or an NoSQL database management system, and one or more databases DBS 8041, DBS 8061, and/or DBS 8021, may be or comprise an object oriented database, a relational database and/or an NoSQL database. More particularly, the archive DBMS 804 and/or the source database DBMS 806A may be or comprise one or more prior art database management systems including, but not limited to, an ORACLE DATABASE™ database management system marketed by Oracle Corporation, of Redwood City, Calif.; a Database 2™, also known as DB2™, relational database management system as marketed by IBM Corporation of Armonk, N.Y.; a Microsoft SQL Server™ relational database management system as marketed by Microsoft Corporation of Redmond, Wash.; MySQL™ as marketed by Oracle Corporation of Redwood City, Calif.; and a MONGODB™ as marketed by MongoDB, Inc. of New York City, USA; the POSTGRESQL™ open source object-relational database management system; and/or a NoSQL database.

It is understood that the scope of meaning of the term "NoSQL" as defined within the present disclosure includes a class of database management systems that do not follow all of the rules of a relational database management system and might not use traditional structured query language (hereinafter, "SQL") to query data. This type of database is generally a complementary addition to relational database management systems and SQL. Some notable implementations of NoSQL are the CASSANDRA DATABASE™, marketed by Facebook, Inc., of Menlo Park, Calif.; BIGTABLE™ marketed by Google, Inc., of Mountain View, Calif.; and SIMPLEDB™, marketed by Amazon.com, Inc., of Seattle, Wash.

A NoSQL database does not necessarily follow the strict rules that govern transactions in relational databases. These violated rules are Atomicity, Consistency, Integrity, Durability. For example, NoSQL databases do not use fixed schema structures and SQL joins.

The source server 806 may bi-directionally communicate and transfer data with the archive DBMS 804 and the target system 802 via the network 800 by suitable electronic communications messaging protocols and methods known in the art including, but not limited to, Simple Object Access Protocol, Representational State Transfer, and/or a web service adapted to conform with the architecture and structure of the World Wide Web.

It is understood that the archive DBMS 804 comprises an archive system software program SW.ARC comprised within, hosted by and/or enabled by a bundled computer software and hardware product such as, but not limited to, a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, or WINDOWS 8™ operating system marketed by Microsoft Corporation of Redmond, Wash.; or (d.) other suitable computational system or electronic communications device known in the art capable of providing or enabling a electronic communications and database management operations known in the art.

It is understood that the source server 806 additionally comprises a source system software program SW.SRC comprised within, hosted by and/or enabled by a bundled computer software and hardware product, such as, but not limited to, a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, or WINDOWS 8™ operating system marketed by Microsoft Corporation of Redmond, Wash.; or (d.) other suitable computational system or electronic communications device known in the art capable of providing or enabling a electronic communications and database management operations known in the art.

It is understood that the target system 802 also comprises a local system software program SW.TGT comprised within, hosted by and/or enabled by a bundled computer software and hardware product, such as, but not limited to, a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, or WINDOWS 8™ operating system marketed by Microsoft Corporation of Redmond, Wash.; or (d.) other suitable computational system or electronic communications device known in the art capable of providing or enabling a electronic communications and database management operations known in the art.

Figure 9:
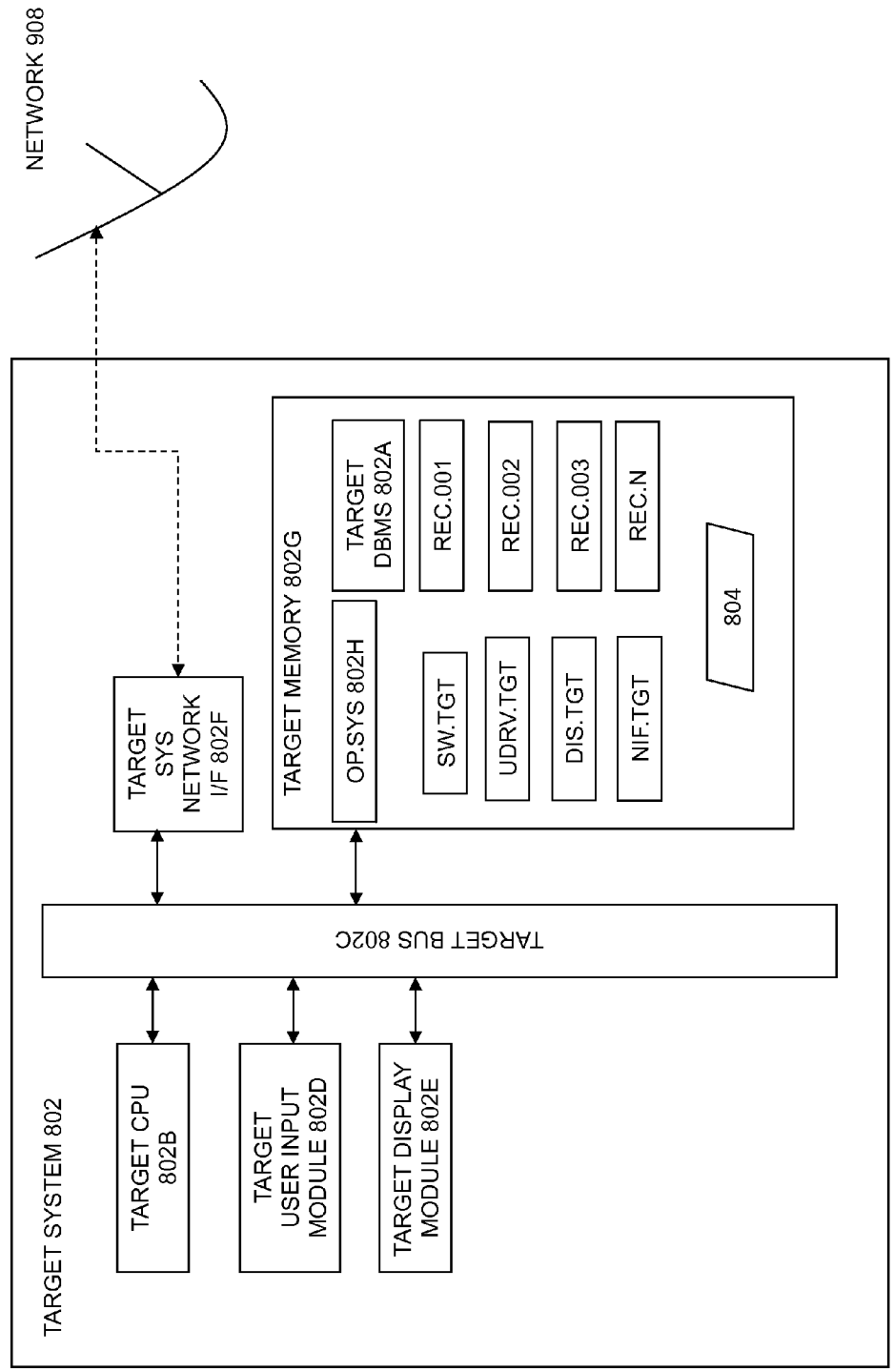
FIG. 9 is a block diagram of the target system of the electronic communications network of FIG. 8.

Referring now generally to the Figures, and particularly to FIG. 9, FIG. 9 is a block diagram of the target system 802 of the electronic communications network 800 of FIG. 8, wherein the target system 802 may comprise: a central processing unit ("CPU") 802B; a user input module 802D; a display module 802E; a software bus 802C bi-directionally communicatively coupled with the CPU 802B, the user input module 802D, the display module 802E; the software bus 802C is further bi-directionally coupled with a network interface 802F, enabling communication with alternate computing devices by means of the electronic communications network 800; and a memory 802G. The target software bus 802C facilitates communications between the above-mentioned components of the target system 802.

The memory 802G of the target system 802 includes a target software operating system OP.SYS 802H. The target software OP.SYS 802H of the target system 802 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS XP™, or WINDOWS 8™ operating system as marketed by Microsoft Corporation of Redmond, Wash.; or the MAC OS X operating system or iPhone G4 OS™ as marketed by Apple, Inc. of Cupertino, Calif. The target memory 802G further includes the target system software program SW.TGT, a target user input driver UDRV.TGT, a target display driver DIS.TGT, and a target network interface drive NIF.TGT. Within the target DBMS 802A hosted by the target system 802 are a plurality of software records REC.001, REC.002, REC.003, and REC.N.

The exemplary target system software program SW.TGT is optionally adapted to enable the target system 802 to (a.) generate messages and communicate with the archive DBMS 804 and the source server 806, (b.) process communications with and process messages received from the archive DBMS 804 and the source server 806, and (c.) manage the target DBMS 802A to perform, execute and instantiate all elements, aspects and steps as required of the target system 802 to practice the invented method in its various preferred embodiments interaction with the archive DBMS 804 and optionally the source server 806.

Referring now generally to the Figures, and particularly to FIG. 10, FIG. 10 is a block diagram of the source server 806 of the electronic communications network 800 of FIG. 8, wherein the source server 806 comprises: a central processing unit ("CPU") 806B; a user input module 806D; a display module 806E; a software bus 806C bi-directionally communicatively coupled with the CPU 806B, the user input module 806D, the display module 806E; the software bus 806C is further bi-directionally coupled with a network interface 806F, enabling communication with alternate computing devices by means of the electronic communications network 800; and a source memory 806G. The source software bus 806C facilitates communications between the above-mentioned components of the source server 806.

The memory 806G of the source server 806 includes a source software operating system OP.SYS 806H. The source software OP.SYS 806H of the source server 806 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS XP™, or WINDOWS 8™ operating system as marketed by Microsoft Corporation of Redmond, Wash.; or the MAC OS X operating system or iPhone G4 OS™ as marketed by Apple, Inc. of Cupertino, Calif. The source memory 806G further includes the source system software program SW.SRC, a source user input driver UDRV.SRC, a source display driver DIS.SRC, and a source network interface drive NIF.SRC. Within a source DBMS 806A are a plurality of software records REC.001, REC.002, REC.003, and REC.N.

The exemplary source system software program SW.SRC is optionally adapted to enable the source server 806 to (a.) generate messages and communicate with the archive DBMS 804 and the target system 802, (b.) process communicate with and process messages received from the archive DBMS 804, and the target system 802, and (c.) manage the source DBMS 806A to perform, execute and instantiate all elements, aspects and steps as required of the source server 806 to practice the invented method in its various preferred embodiments interaction with the archive DBMS 804 and the target system 802.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

The invention claimed is:

1. A method comprising:
   a. in a target database, maintaining the most recent versions of a plurality of records maintained in a source database;
   b. archiving outdated versions of the plurality of records as maintained by the target database in an archive;
   c. receiving a command to select record versions as stored in the target database and the archive in relation to a specified restore time point, wherein each selected archived record version of each record has an associated version time point that is earlier than the restore time point and closest to the restore time point of all archived record versions of a same record; and
   d. applying the selected archived record versions to restore a source database.

2. The method of claim 1, wherein the source database is the target database.

3. The method of claim 2, wherein the target database is bi-directionally communicatively coupled with the archive by a database management system.

4. The method of claim 1, wherein the source database is substantively located externally to a database management system.

5. The method of claim 4, wherein the source database is bi-directionally communicatively coupled with the target database by means of an electronic communications system.

6. The method of claim 1, wherein the previously stored version of the selected archived record versions are overwritten in the source database in a restore action.

7. The method of claim 6, wherein at least one previously stored version of at least one archived record version that had been deleted in applying the selected archived record versions to the source database is inserted into the source database.

8. The method of claim 6, wherein the target database is comprised within a data management system.

9. The method of claim 6, wherein the target database is comprised within a database management system.

10. The method of claim 6, wherein the target database is comprised within a data storage system.

11. The method of claim 1, wherein the source database is the target database, and further comprising communicating the selected archived record versions to the source database at a remote server.

12. The method of claim 11, further comprising communicating the selected archived record versions to the remote server via an electronic communications network.

13. The method of claim 11, further comprising applying the selected archived record versions to restore the source database accessible to the remote server by applying the selected archived record versions to the source database.

14. The method of claim 1, wherein the command to select the archived record versions is input directly to a computer, and the computer at least partially comprises the target database.

15. The method of claim 14, wherein the target database is substantively comprised within the computer.

16. The method of claim 14, wherein the archive is substantively comprised within the computer.

17. The method of claim 1, wherein the command to select the archived record versions is provided via an electronics communications network to the target database.

18. The method of claim 1, wherein the target database is a relational database.

19. The method of claim 1, wherein the target database is a NoSQL oriented database.

20. The method of claim 1, wherein the target database is an object oriented database.

21. The method of claim 1, further comprising a record version selection performed after receiving a command to select record versions as stored in the target database and the archive in relation to a specified restore time point, selecting records from both the target database and the archive in a single query by filtering with unique record identifiers and date ranges from both the target database.

22. The method of claim 1, further comprising selecting record versions from the archive by filtering with unique record identifiers and date ranges, and applying the selecting record versions directly to the target database and without application of the selected record versions to the target database.

23. The method of claim 1, further comprising a target database archival action performed after receiving a command to select record versions as stored in the target database and the archive in relation to a specified restore time point, wherein a copy of each target database record version is first recorded into the archive prior to selecting and applying the record versions in performance of the received command by applying selected record versions to the target database.

24. A system, the system bi-directionally communicatively coupled with an external source database, the system comprising:
   a memory storing a target database and an archive;
   a processor bi-directionally communicatively coupled with both the memory and the external data source, and the memory is configured to store instructions that, when executed by the processor, cause the system to:
   a. maintaining the most recent versions of a plurality of records in a target database;
   b. archiving outdated versions of the plurality of records as maintained by the target database in the archive; and
   c. upon receipt of a command to select record versions as stored in the target database and the archive in relation to a specified restore time point, communicate the selected archived record versions to the source database, wherein each selected archived record version of each record has an associated version time point that is earlier than the restore time point and closest to the restore time point of all archived record versions of a same record.

25. The system of claim 24, the system further comprising a data management system maintaining the target database.

26. The system of claim 24, the system further comprising a database management system maintaining the target database.

27. The system of claim 24, the system further comprising a data storage system maintaining the target database.

* * * * *